July 10, 1956

W. GREEN 2,753,818

CONCAVE PROJECTION SCREENS

Filed April 22, 1953

INVENTOR.
William Green
BY
Kenway, Jenney, Witter & Hildreth
Attys.

July 10, 1956  W. GREEN  2,753,818
CONCAVE PROJECTION SCREENS
Filed April 22, 1953  3 Sheets-Sheet 3

INVENTOR.
William Green
BY
Kenway, Jenney, Witter & Hildreth
Att'ys.

United States Patent Office 2,753,818
Patented July 10, 1956

2,753,818

CONCAVE PROJECTION SCREENS

William Green, Barrington, R. I.

Application April 22, 1953, Serial No. 350,475

6 Claims. (Cl. 108—1)

This invention comprises a new and improved projection screen presenting a smooth, continuous, concave surface such, for example, as that required in the dome of a planetarium. It is characterized by a vacuum supported integument that is entirely free from distortion by its supporting system.

For many years the problem of providing a smooth continuous concave or spherical surface in a projecting screen has engaged the effort of builders of planetariums and those interested in teaching astronomy, uranography and navigation. Because there are now available apparatus that can show by projection the infinite variety in the appearance of the night sky, planetariums are being increasingly installed at museums, schools and universities. In a planetarium a projector is essential but so too is a dome shaped screen. Heretofore the cost of these screens has exceeded that of the projector. Although there are now in the United States approximately one hundred planetariums, the present state of the art of dome design is such that almost no dome is a duplicate of another.

Going more into detail, my novel construction includes a dome fabricated of semilune shaped segments of impervious white cloth. This dome is attached at its circular edge to a rigid ring supported at the planetarium's horizon line. A rigid structure of which the rigid ring is a part and an outer impervious cover make up the integuments of a chamber in which I maintain by means of an exhaust fan a slight vacuum. The necessary vacuum for this purpose is approximately one quarter of an inch static water pressure.

This structure provides a hemispherical dome shaped screen devoid of distortion due to supporting members. Its cost is low. It is free of fissures or other small openings which admit light. Because the dome is not rigid, the adverse acoustical properties common to rigid domes (whispering gallery effects) are minimized. By employing an exhaust fan whose capacity exceeds that needed to maintain adequate screen supporting vacuum, and by having an opening in the screen at its apex, ventilation may be attained.

The structure above described may take form of a permanent installation or it may be constructed of knocked down members of light weight and compact design, thus providing a readily portable planetarium dome.

These and other features of the invention will be best understood and appreciated from the following description of a preferred embodiment thereof selected for purposes of illustration and shown in the accompanying drawings in which.

Figure 1:
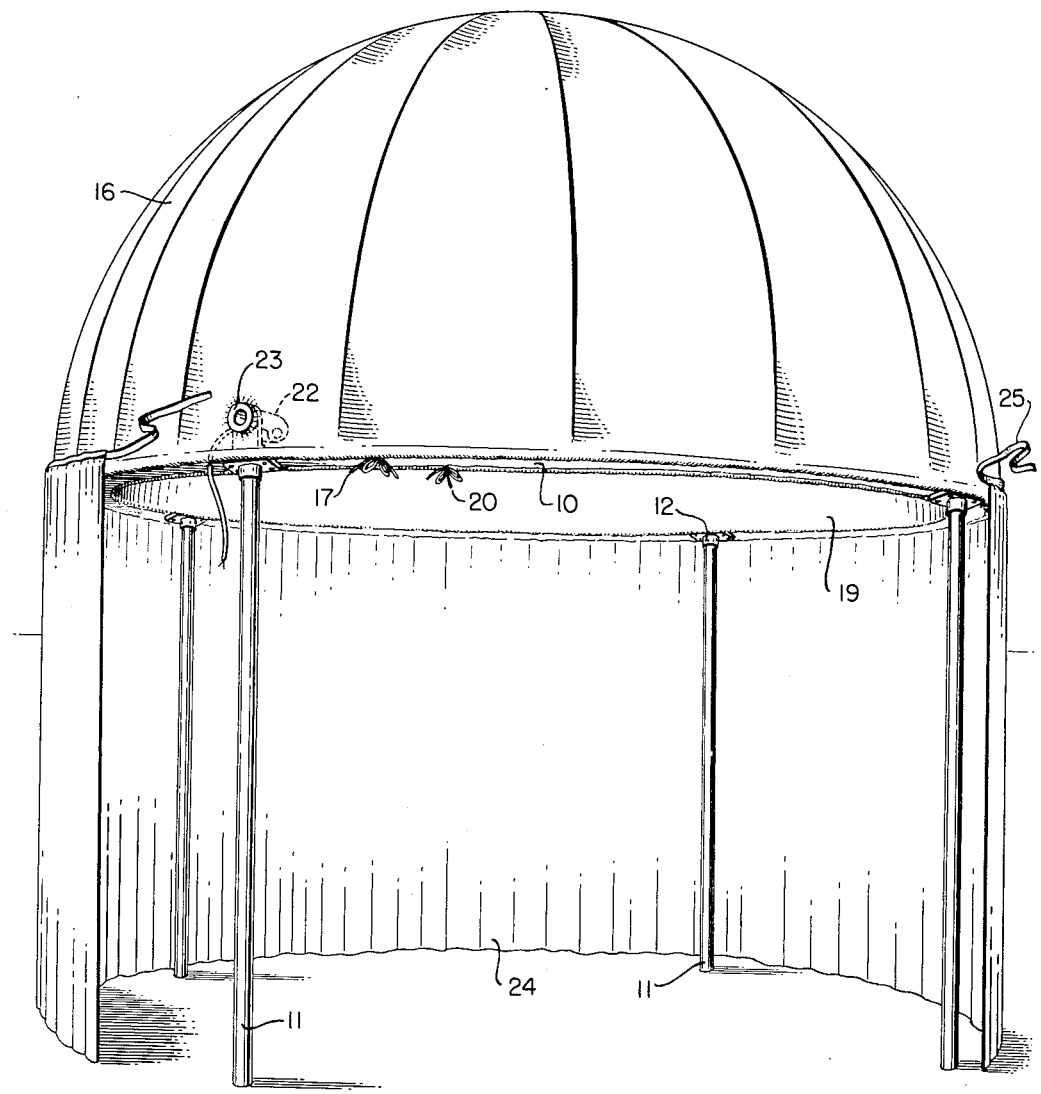
Fig. 1 is a perspective view.
Figure 2:
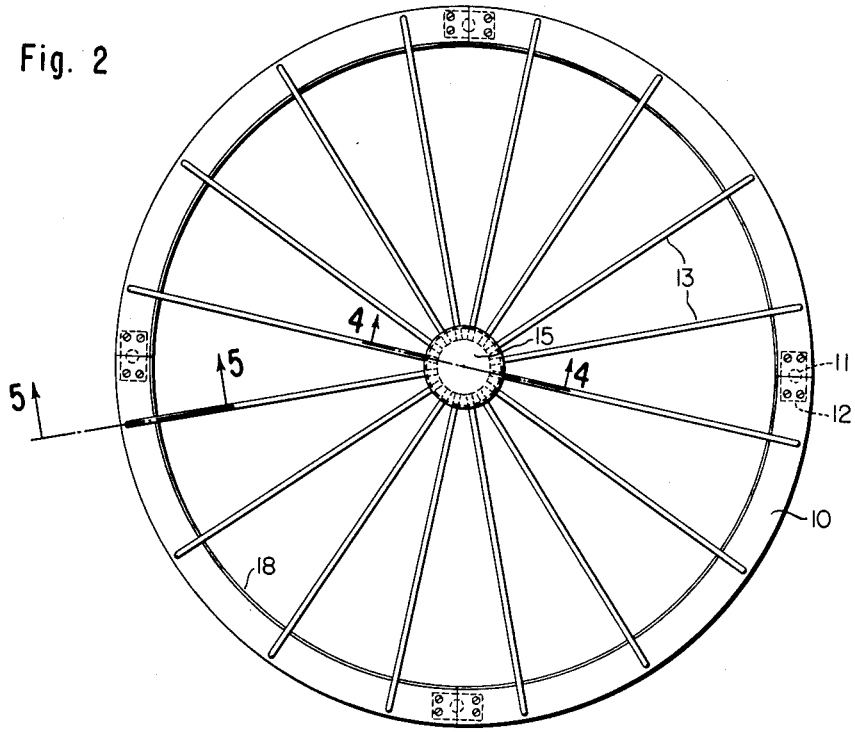
Fig. 2 is a plan view of the supporting structure.
Figure 3:
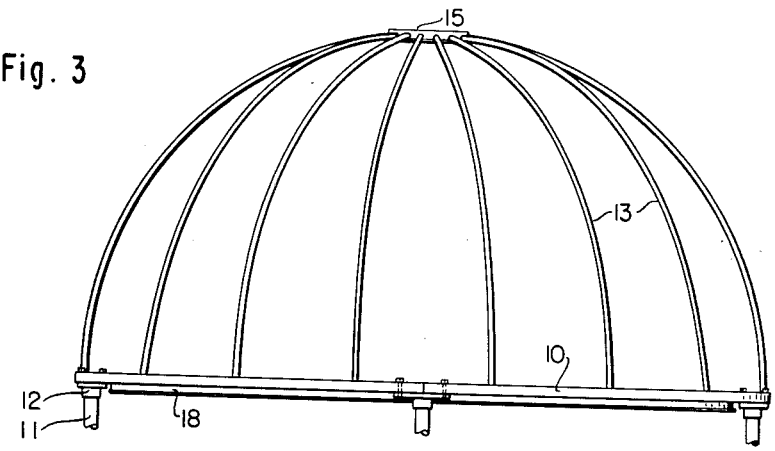
Fig. 3 is a corresponding view in elevation.
Figure 4:
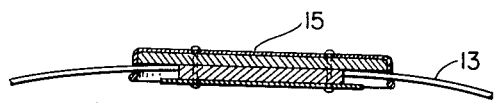
Fig. 4 is a view in cross-section on the line 4—4 of Fig. 2.
Figure 5:
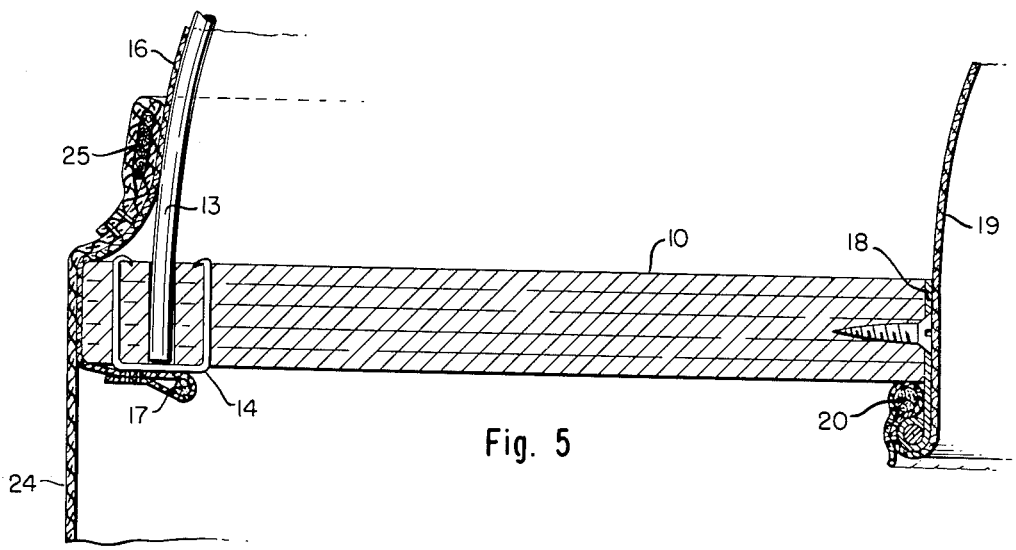
Fig. 5 is a view in cross-section on an enlarged scale of the supporting ring.

As herein shown the dome is hemispherical in shape and includes a flat annular ring 10 which may conveniently be constructed of segments of plywood, and this ring is supported at convenient height above the ground level by columns 11 which may be pipe sections threaded into caps or flanges 12 at their upper ends and to which the ring is secured or bolted. From the ring 10 rises a skeleton frame made up of curved ribs 13 converging to a central top disk 15. The ribs may be constructed of stiff round wire having approximately a 90° curvature and set at their lower ends in the ring 10 as shown in Fig. 5 where flat staples 14 form the bottom of sockets for the wires and also seal the apertures formed in the ring to receive the wires.

An outer integument or cover 16, which may be formed of any impervious fabric previously cut and united in hemispherical form, is drawn about the outer circumference of the ring 10 and secured to its lower surface with the assistance of a draw string 17. The cover 16 completely encloses the skeleton frame including the top disk 16 as well shown in Fig. 6.

Figure 6:
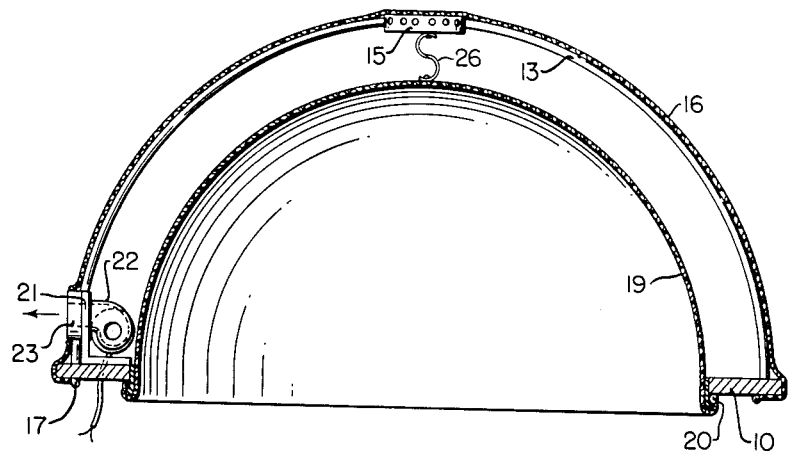
Fig. 6 is a cross-sectional view of the dome.

The inner circumference of the ring 10 is provided with a circular metallic rim 18 that extends somewhat below the lower surface of the ring and is rolled to form a circumferential channel beneath it. The inner integument 19 which presents the projection surface is constructed of impervious fabric pre-formed in hemispherical shape, being somewhat smaller in diameter and concentrically disposed with respect to the cover 16. The circular edge of the inner integument is provided with a draw string 20 and is attached thereby to the inner circumference of the ring 10 by being drawn into the annular channel formed by the rim 18. As shown in Fig. 6 it is loosely attached at its zenith by a flexible tape 26 or the like to the top disk 15 of the frame for the purpose of preserving the general relation of the two integuments when the dome is not in use.

As further shown in Fig. 6 a bracket 21 is secured to the upper face of the ring 10 and in this is mounted a small motor driven blower 22 having a discharge outlet 23 directed through the outer integument 16. It will be understood that by operating the blower 22 a slight vacuum may be maintained within the chamber formed by the integuments 16 and 19 and the ring 10 and that the effect of this vacuum will be to subject the inner integument 19 to an expanding suction or external pressure that will cause it to assume a perfectly smooth spherical surface undistorted in any way by contact with a rigid supporting system. It has been found in practice that a vacuum of no more than one-half inch of water is fully adequate to maintain the integument 19 in its concave spherical shape.

The ring 10 may be supported at a height convenient for the observer to pass freely beneath it, and in order to improve the light contrast of the projected images, an opaque curtain 24 may be suspended from the outer circumference of the ring 10 and held in position thereon by a draw string 25.

While the dome has been described above as supported by the ring 10, it will be understood that it may be erected upon any supporting structure providing a circular opening as, for example, a ceiling in a building. In that case the inner integument rises from the edge of the opening and the evacuated chamber is supplied by the ceiling and the space enclosed by the building.

Having thus disclosed my invention and described in detail a preferred embodiment thereof, I claim as new and desire to secure by Letters Patent:

1. A planetarium dome comprising a ring supporting a stiff hemispherical skeleton frame, an outer impervious cover for the frame, an inner fabric hemisphere attached at its circular edge to said ring, and a blower for exhausting air between the outer cover and the inner fabric hemisphere.

2. A concave projection screen comprising a rigid annular support, a pair of flexible impervious integuments secured at their edges to the support and being disposed substantially one within the other, thereby forming a continuous chamber, and means maintaining a partial vacuum therein and so subjecting the inner integument to expanding tension.

3. A concave projection screen comprising a flat ring, a pair of impervious integuments secured at their edges to the ring in concentric relation, columns supporting the ring above the ground level, and a blower mounted on the ring and operating to exhaust air from the space between the two integuments.

4. A concave projection screen comprising a flat ring, a frame rising above the ring, impervious substantially hemispherical integuments attached one within the other in concentric relation to the ring and together forming an air-tight chamber enclosing the frame, and a fan having an intake connection with the chamber for maintaining the inner integument expanded under partial vacuum created in said chamber.

5. A planetarium dome comprising a flat plywood ring of substantial width supported above the ground level and having a depending metallic flange about its inner circumference, an inner integument of impervious fabric of preformed hemispherical shape attached at its circular edge to said flange, a skeleton frame rising from the outer portion of the ring and including a central disk, a second hemispherical integument attached to the outer circumference of the ring and forming with the inner integument a curved chamber of substantially uniform width enclosing the skeleton frame, a flexible connection between the inner integument and said central disk, and a motor driven blower mounted on the ring within the chamber and discharging therefrom.

6. A concave projection screen comprising a fixed support providing a circular opening, a flexible impervious integument preformed in substantially spherical shape and secured at its circular edge in said opening, means providing a substantially air-tight chamber above said integument, and means for maintaining a partial vacuum therein whereby the integument is held in its preformed shape without being distorted by the support.

References Cited in the file of this patent

UNITED STATES PATENTS

| | | |
|---|---|---|
| 240,868 | Waters | May 3, 1881 |
| 1,825,800 | Houseman | Oct. 6, 1931 |
| 2,071,093 | Van Horn | Feb. 16, 1937 |
| 2,649,101 | Suits | Aug. 18, 1953 |